Sept. 6, 1927.
J. WHALEN
1,641,361
ABRADING APPARATUS
Filed Sept. 1, 1925
4 Sheets-Sheet 1

Inventor
James Whalen

Sept. 6, 1927.  J. WHALEN  1,641,361
ABRADING APPARATUS
Filed Sept. 1, 1925   4 Sheets-Sheet 4

Inventor
James Whalen
By Spencer Small & Hardman
his Attorneys

Patented Sept. 6, 1927.

1,641,361

UNITED STATES PATENT OFFICE.

JAMES WHALEN, OF DAYTON, OHIO, ASSIGNOR, BY MESNE ASSIGNMENTS, TO DELCO-REMY CORPORATION, OF DAYTON, OHIO, A CORPORATION OF DELAWARE.

ABRADING APPARATUS.

Application filed September 1, 1925. Serial No. 53,797.

This invention relates to abrading glass by means of a sand blast.

One of the objects of the invention is to reduce the cost of making holes in pieces of sheet glass and this object is accomplished by directing a sand blast against an exposed portion of a piece of glass where a perforation is desired.

A further object is to provide a machine with which perforations in glass may be made rapidly by means of a sand blast.

Further objects and advantages of the present invention will be apparent from the following description, reference being had to the accompanying drawings, wherein a preferred form of embodiment of the present invention is clearly shown.

Figure 2:
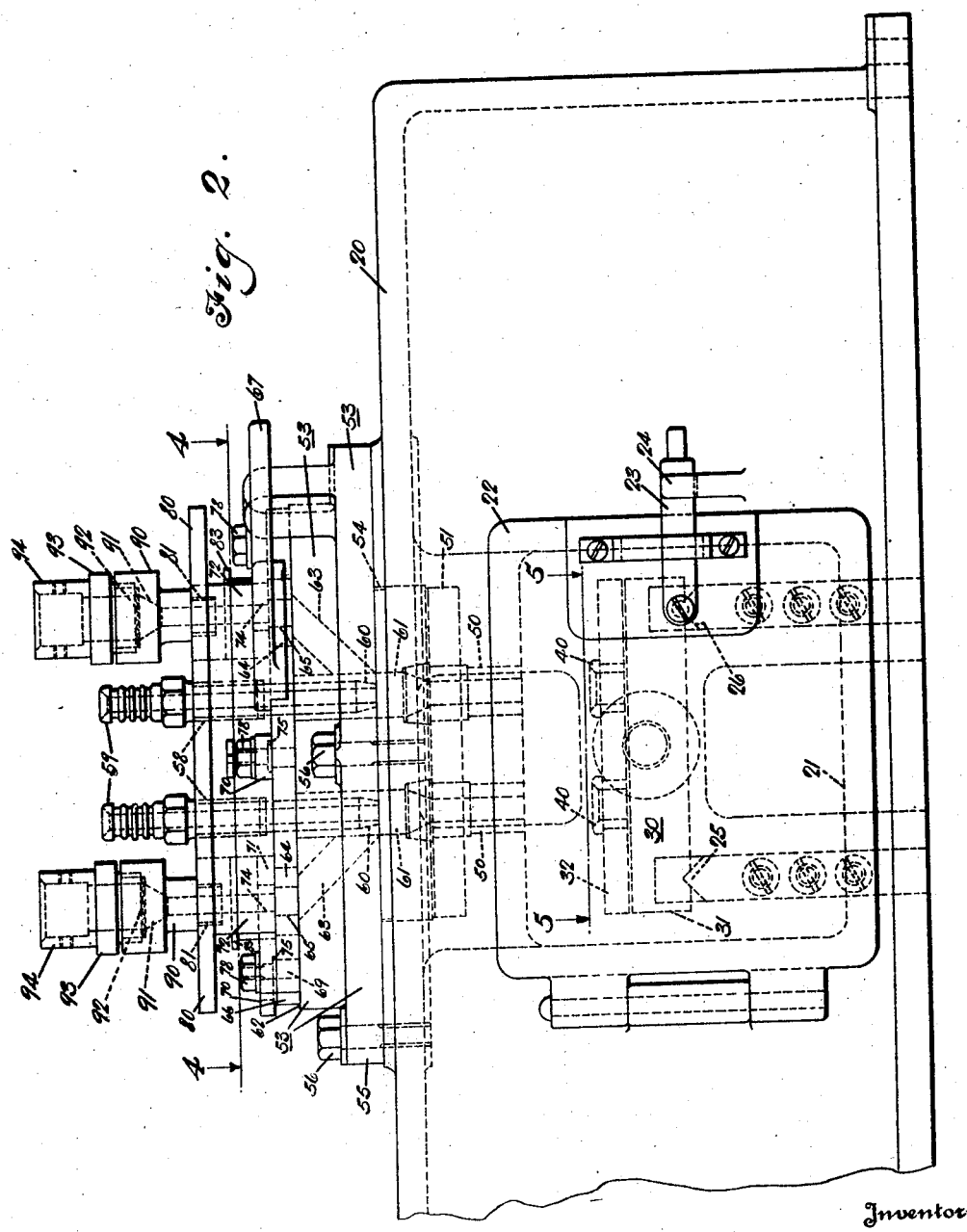
Fig. 2 is an end elevation.
Figure 3:
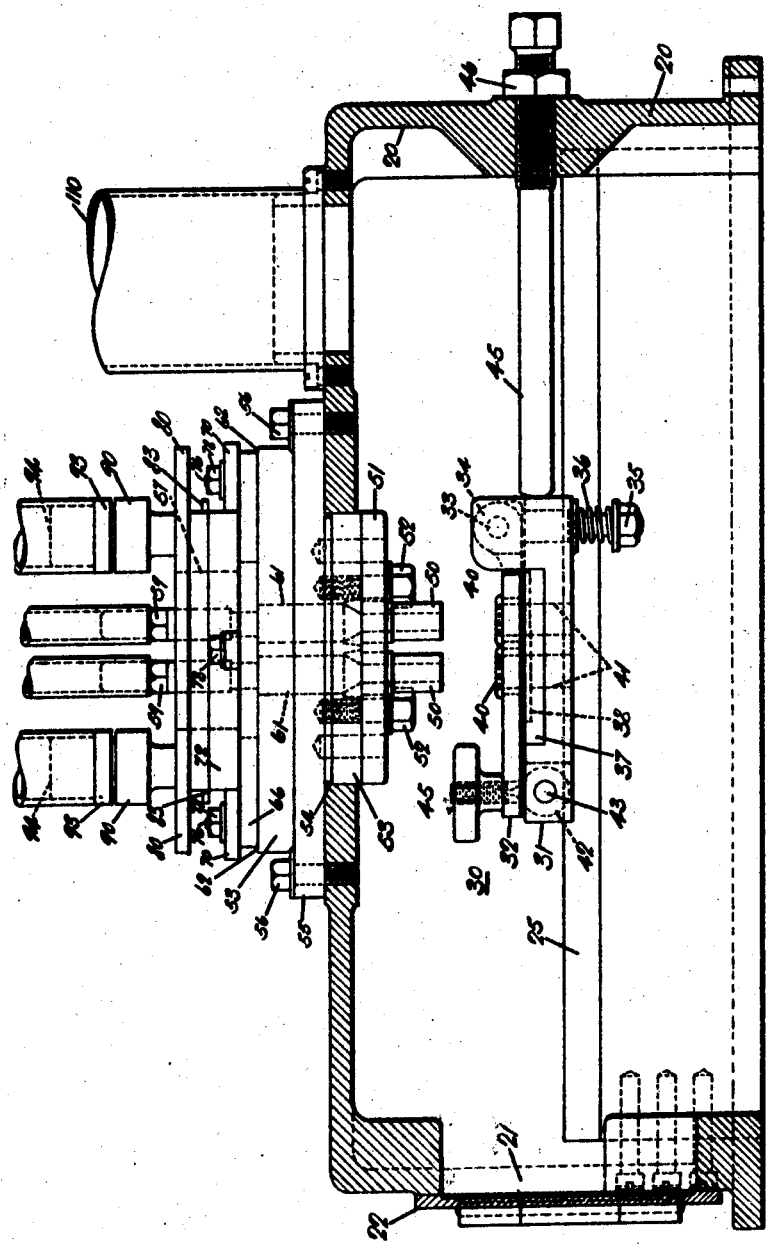
Fig. 3 is a side elevation partly in section, the section being taken on line 3—3 of Fig. 1.
Figure 4:
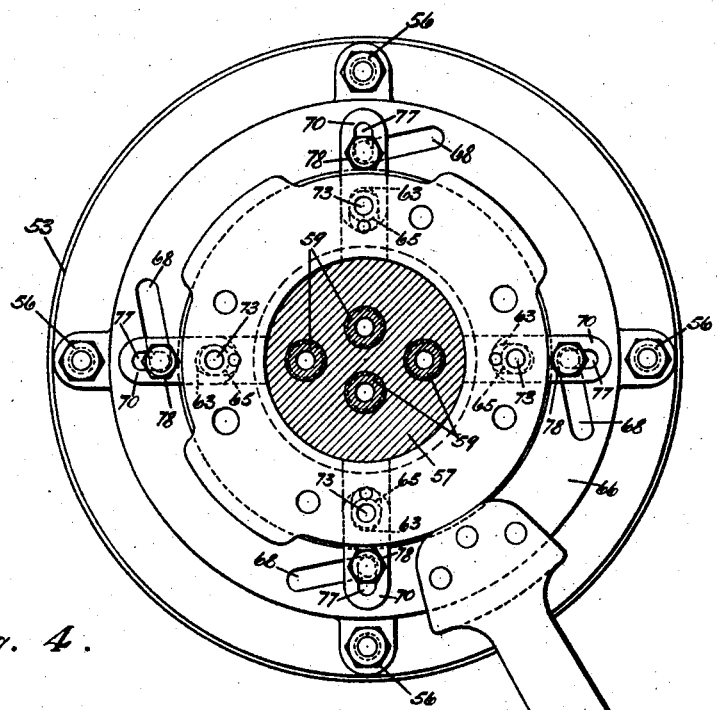
Figures 5, 6:
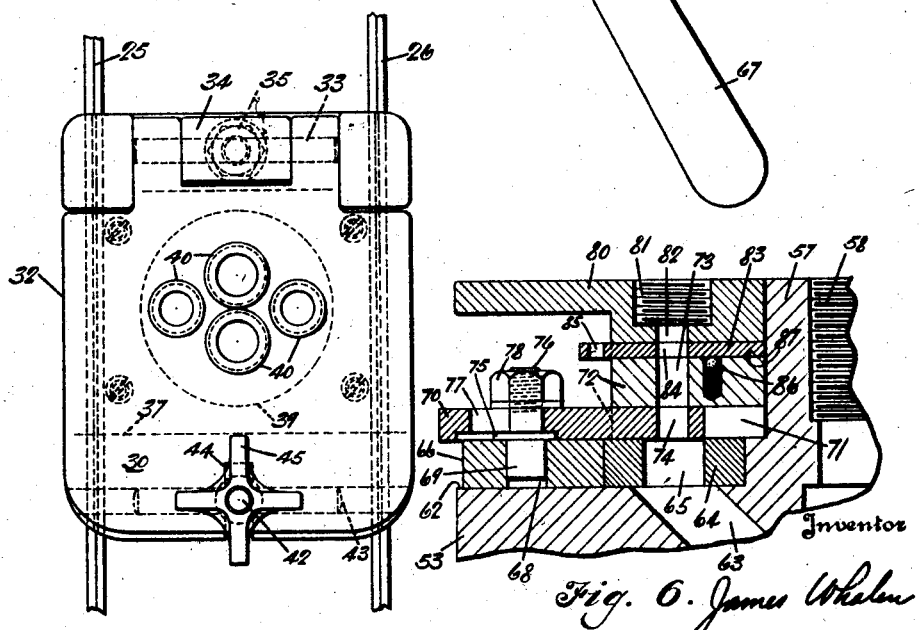

Figs. 4 and 5 are sectional views on the lines 4—4 and 5—5, respectively, of Fig. 2.

Figure 1:
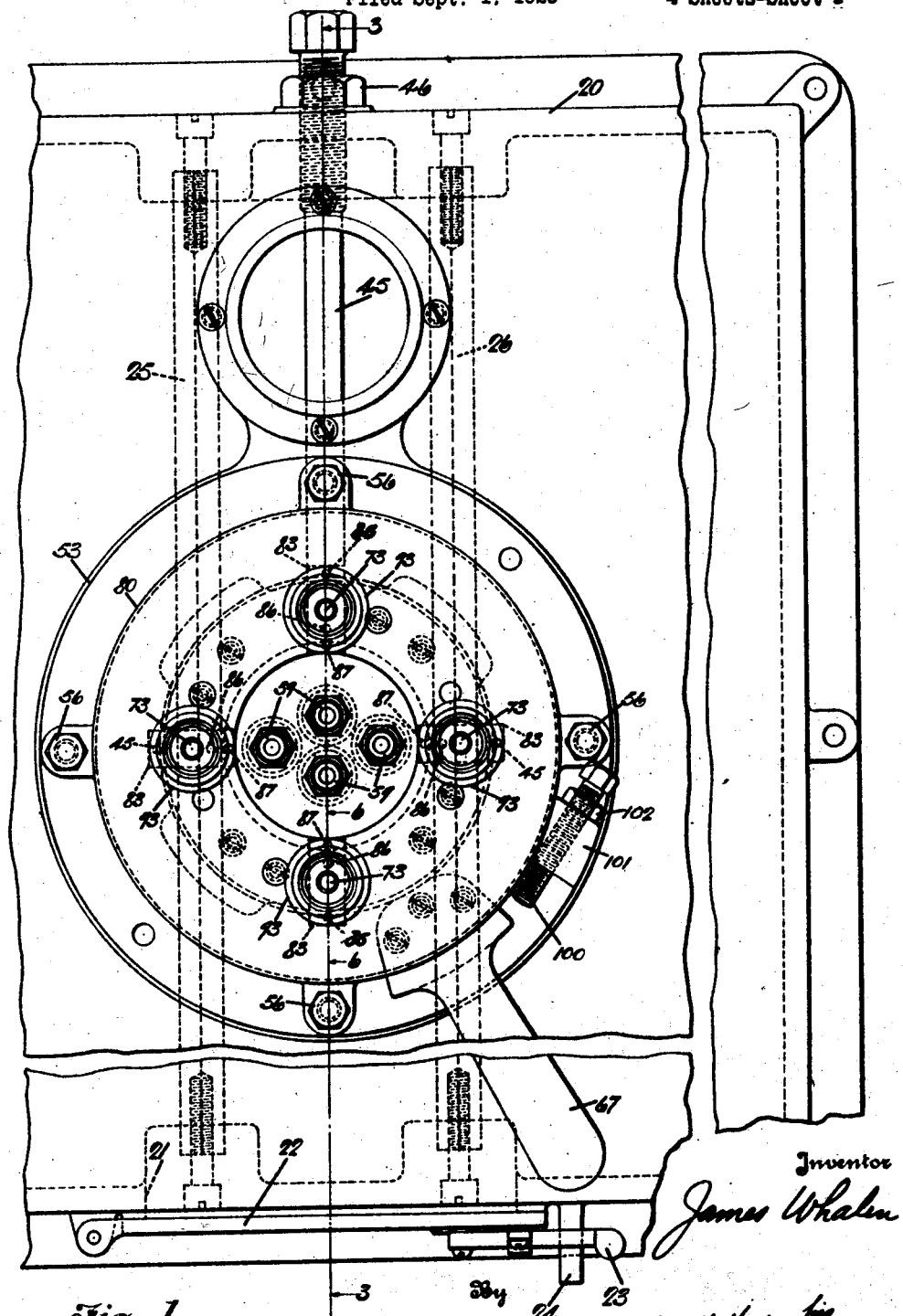
Fig. 1 is a plan view of one form of the apparatus for perforating a sheet of glass by means of a sand blast.

Fig. 6 is a fragmentary sectional view on an enlarged scale, this view being taken on the line 6—6 of Fig. 1.

Referring to the drawings, the glass perforating apparatus includes a box-like frame 20 having an opening 21 in one of its vertical walls, the opening being closed by a hinged door 22 carrying a pivoted latch 23 which cooperates with a lug 24 on the frame 20. Opposite walls of the frame 20 support guide rails 25 and 26 on which a work holder 30 is slidably mounted.

The work holder 30 includes a lower block 31 having grooves for receiving the guide rails 25 and 26, and an upper block 32 which is hingedly connected to the lower block 31 by a hinge pin 33 passing through the head of eye bolt 34, the shank of which passes through a hole in the lower block 31. The bolt 34 receives a nut 35 which clamps a spring 36 against the lower surface of the block 31. The block 31 carries a plate 37 having a cavity 38 for receiving a plate of glass indicated in Fig. 5 by the broken line circle 39. The upper block 32 carries apertured bushings 40 of wear resisting metal. The holes in the bushings 40 are in alignment with holes 41 in the lower block 31. The work piece is clamped in the cavity 38 by means including an eye bolt 42 pivotally connected by pin 33 with the lower block 31. The shank of the bolt 42 extends through a notch 44 in the upper block 32 and receives a nut 45 by which the upper block 32 is clamped against the work received by the cavity 38. The spring 36 causes the work to be resiliently clamped between the blocks 31 and 32. The work holder is inserted into the machine through the opening 21 and is moved along the guide rails 25 and 26 until it engages a stop 45 which is screwed through a wall of the frame 20 and maintained in position of adjustment by a lock nut 46. The function of the stop 45 is to locate the holes in the bushings 40 in alignment respectively, with sand blast nozzles 50 which are spaced from each other corresponding to the spacing of holes in the bushing 40.

The nozzles 50 are carried by a nozzle supporting block 51 attached by screws 52 to a bracket 53 which is insertable through an opening 54 in the top wall of the frame 20, and is provided with a flange 55 resting upon the top wall of the frame 20 and secured thereto by screws 56. Bracket 53 includes a cylindrical extension 57 having threaded orifices 58 each for receiving an air nozzle 59. The lower ends 60 of nozzles 59 discharge into sand and air mixing chambers 61 provided in the bracket 53. Bracket 53 is provided with a flat surface 62 surrounding the cylindrical extension 57. Sand passages 63 extend obliquely through the bracket 53, from the surface 62 to the sand and air mixing chambers 61. The surface 62 supports a ring 64 having openings 65 in alignment with the passages 63. The ring 64 provides a bearing for a movable ring 66 which is turned by handle 67. The ring 66 is provided with equidistant oblique slots 68 each for receiving a pin 69 which is connected with a slide valve 70. Valve 70 is moved radially with respect to the center of the extension 57 of bracket 53 and is guided in its radial movement by radially extending notches 71 provided in a ring 72 which rests upon the ring 64 and is secured thereto. The ring 72 has passages 73 in alignment with the passages 65 of ring 64. When the valve 70 is in the position shown, its port 74 will connect a passage 73 with a passage 65. Since each pin 69 passes through an oblique slot 68 in the ring 66 and is attached to the sliding valve 70, it is obvious, that by turning the ring 66 counterclockwise, the valves 70 will be moved from the closed position shown in Fig. 4 to the open position shown in Fig. 6. In this way the valves 70 controlling the flow of sand to the mixing chambers 61 will be operated simultaneously.

Each slide valve 70 may be adjusted radially with respect to the ring 66 while the ring is stationary in order that the degree of opening the valves by the handle 67 may be varied as desired. Some of the valves may be fully opened while others only partly opened, in order to vary the amount of sand which may pass through any of the sand ducts 63 when the handle is moved to the position for opening the valves. This adjustment of the valves 70 is accomplished by providing each pin 69 with a shoulder 75 and with a threaded shank 76 which passes through a slot 77. Slot 77 of the valve 70 receives a nut 78 by which the valve 70 may be clamped between the shoulder 75 and the nut 78 so that the valve 70 will be secured in a position of adjustment relative to the pin 69.

The ring 72 supports a ring 80 having threaded openings 81 in alignment respectively, with openings 82 which in turn are in alignment with the openings 73 in the ring 72. The flow of sand from a passage 82 to a passage 73 is controlled by a slide valve 83 which is radially movable toward the center of extension 57 of bracket 53 and is guided in its movement by a radial slot provided in the member 80. The valve 83 is provided with a port 84 for connecting the passages 82 and 73 when the valve is in the position shown. To interrupt the flow of sand from the passage 82 to the passage 73, the valve is pulled upwardly by a suitable hook adapted to be received by the hole 85 in the exposed end of the valve 83. The valve 83 is indexed in its closed position by spring pressed ball 86 which engages a recess 87 located in the bottom surface of the valve 83.

It is therefore apparent that the flow of sand from each passage 81 to its corresponding passage 63 is controlled individually by the valve 83 and simultaneously by the movement of the lever 67; also the flow of said from the passage 73 to the passage 63 is controlled individually by adjustment of each valve 70 with respect to the valve operating ring 66.

Each threaded opening 81 receives a coupling 90 having a passage 91 into which sand may flow through a screen 92 which is secured against the coupling 90 by a second coupling 93 having a tubular extension 94 for receiving a pipe leadng from a supply of dry sand.

The upper ends of the nozzles 59 are connected with a source of compressed air by suitable hose connections.

To operate the apparatus, the work piece is inserted in the work holder 30 while the work holder is outside the frame 20. The work holder and work are placed upon the guide rails 25 and 26 and the work holder is moved until it engages the stop 25 which has previously been adjusted so that the perforated bushings 40 are directly below the sand blast nozzles 50. The air is turned into the air nozzles 66 by the opening of a suitable air valve, (not shown) and the lever 67 is moved counterclockwise as viewed from the top of the machine until it strikes a stop screw 100 which is threaded through a lug 101 carried by the bracket 53. The screw is maintained in adjusted position by lock nut 102. By turning the screw 100 the amount of movement of all the valves 70 by the handle 67 can be varied. The sand will then flow through the sand ducts into the mixing chamber 61 and sand will be directed from the chamber 61 through nozzles 50 by the air issuing from the nozzles 60. This will cause particles of the sand to rush with great rapidity and velocity through the bushiongs 40 and to beat upon the upper surface of the glass retained within the work holder. Particles of sand will cut away particles of glass until finally a hole will be made in the glass wherever the glass is exposed between the holes in the bushings 40 and the holes in the lower block 31 of the work holder. The heavier particles of sand will drop into a suitable bin below the frame 20, and the fine dust particles may be removed from the frame 20 through an exhaust pipe 110 which is connected with a suitable air suction device not shown.

If the holes in the work are of the same size it is obvious that the sand valves 70 should be adjusted as to equalize the flow of sand into the mixing chamber 61. If some of the holes are smaller than others, then certain of the valves 70 can be adjusted relative to the ring 66. If some of the holes are omitted, then some of the valves 83 may be closed so that sand will flow only into the holes in the mixing chamber 61 which are in alignment with portions of the glass which are to be perforated. If the spacing of the holes remain the same but the work varies, then different work holders having bushings of the same spacing may be located upon the guides 25 and 26.

In case it is desired to change the spacing of the holes entirely, then an entirely new bracket 53 can be quickly substituted simply by manipulating screws 56; and other work holders having the required spacing of the bushings 40 and holes 41 can be used with the substituted bracket 53.

While the form of embodiment of the present invention as herein disclosed, constitutes a preferred form, it is to be understood that other forms might be adopted, all coming within the scope of the claims which follow.

What is claimed is as follows:

1. Glass perforating apparatus comprising, in combination, a frame, a plurality of sand blast nozzles supported by the frame, and a work holder having opposite walls between which a sheet of glass is located and said walls having aligned holes spaced according to the spacing of the blast nozzles.

2. The method of providing holes of a predetermined size in a plate of glass which consists, in confining a plate between blocks having apertures in alignment, and in directing a blast of sand particles through said apertures in order to abrade the glass, and thereby forming an aperture therein in registration with the apertures of said blocks.

3. A device for sand blasting holes of proper size and spacing in a work piece, comprising in combination: a work piece holder including a recessed block for receiving the work piece and a cover for clamping said work piece in position in said block, the cover having a plurality of apertures spaced according to the spacing of the holes to be provided; removable bushings in said apertures, the inside diameters of which are substantially the same as the diameters of the holes to be provided in the work piece; and a plurality of sand blast nozzles spaced according to the bushings so that each bushing has a nozzle aligned therewith, each nozzle having a discharge end of lesser diameter than the inside diameter of the respective bushing and being spaced a substantial distance from said bushing.

4. A device for sand blasting holes of proper size and spacing in a work piece, comprising in combination: a work piece holder including a recessed block for receiving the work piece and a cover yieldingly hinged to said block and adapted yieldably to clamp said work piece in position in said block, the cover having a plurality of apertures spaced according to the spacing of the holes to be provided; removable bushings in said apertures, the inside diameters of which are substantially the same as the desired diameter of the holes to be provided in the work piece; and a plurality of sand blast nozzles spaced according to the bushings so that each bushing has a nozzle aligned therewith, said nozzles each having a discharge end of lesser diameter than the respective bushings and being spaced a substantial distance from said bushings.

5. A device according to claim 3 in which the block is provided with a plurality of apertures each aligned with a respective bushing in the cover of the block and being equal in diameter to the inside diameter of the corresponding bushing.

6. Glass perforating apparatus, comprising in combination, a frame provided with an opening; a bracket having a portion insertable into said opening and secured to said frame; a plurality of properly spaced sand blast nozzles supported by said bracket; and a work holder having opposite walls between which a sheet of glass is retained, said walls having aligned holes spaced according to the spacing of the sand blast nozzles.

7. Glass perforating apparatus comprising in combination, a frame provided with an opening; a bracket having a portion insertable into said opening and adapted to be secured to said frame; a plurality of sand blast nozzles supported in properly spaced relation by said bracket; air and sand mixing chambers in the bracket each communicating with a nozzle; a sand duct in the bracket leading to each of said chambers respectively; an air duct in the bracket respectively leading to each of said chambers; a plurality of valves supported by the bracket said valves being operable individually to control the sand flow through each respective sand duct; valve members supported on the bracket and simultaneously operable for concomitantly controlling the flow of sand through all of the sand ducts; and a work holder having opposite walls between which a sheet of glass is retained, said walls having aligned holes spaced according to the spacing of the sand blast nozzles.

In testimony whereof I hereto affix my signature.

JAMES WHALEN.